Feb. 10, 1931.  C. A. DE GIERS  1,791,489
LIQUID LEVEL INDICATOR
Original Filed June 10, 1924   2 Sheets-Sheet 1

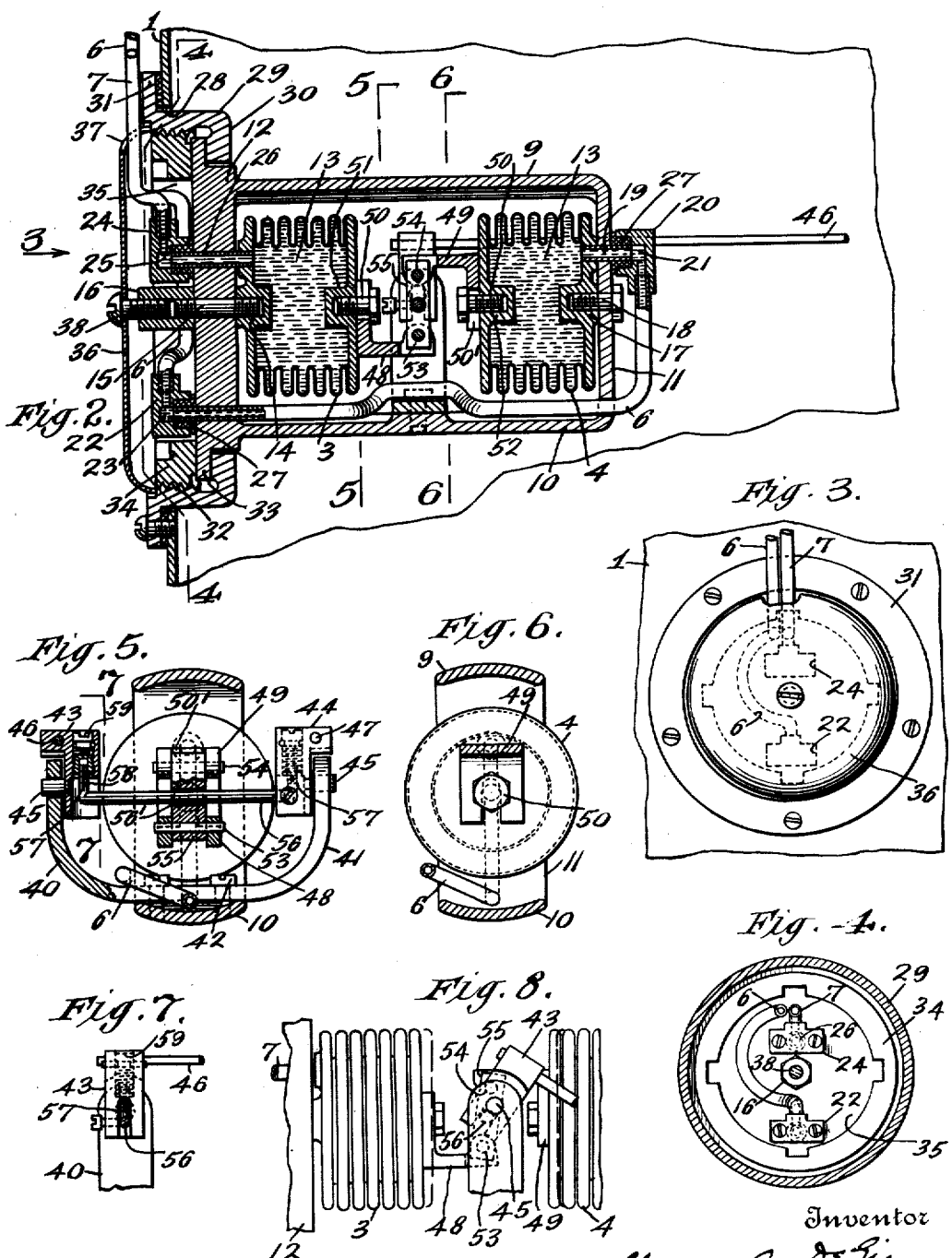

Patented Feb. 10, 1931

1,791,489

UNITED STATES PATENT OFFICE

CLARENCE A. DE GIERS, OF NEW YORK, N. Y., ASSIGNOR, BY MESNE ASSIGNMENTS, TO THE LIQUIDOMETER CORPORATION, OF WILMINGTON, DELAWARE, A CORPORATION OF DELAWARE

LIQUID-LEVEL INDICATOR

Application filed June 10, 1924, Serial No. 719,082. Renewed April 5, 1929.

This invention relates to certain improvements in liquid level indicators or gauges for accurately indicating the amount of liquid in a tank or similar liquid holding receptacle.

This indicator, generally speaking, includes a float and a pair of compressible and expansible chambers, containing a suitable liquid, which are compressed and expanded by the action of the float, these chambers having closed liquid holding connections to a suitable indicating device which is operated by the displacement of the liquid in the chambers due to their expanding and contracting movements. This type of gauge has been found very effective in accurately measuring the liquid contents of a tank or the like with which the instrument is used.

It is desirable where the parts of the instruments are subject to changes in temperature that such changes be accurately compensated for so that compression or expansion in the chambers, due to such temperature changes, will not affect the reading at the indicator and so that an accurate result will be arrived at regardless of the temperature or conditions under which the instrument be used.

It is one object of the present invention to provide an improved construction for balancing the compressible and expansible chambers against temperature changes, the construction being such that as one chamber is collapsed or expanded, due to temperature changes in the chambers or in the line to the indicator, the other chamber is positively collapsed or expanded to a like extent, so that there is no difference in the reading of the indicating device caused by such collapsing or expanding movement.

It is a further object of the invention to provide a unitary tank instrument construction in which the tank instrument, including the two compressible chambers, their float and float arm, and the necessary piping to the indicator, may be assembled as a unit and placed in and removed from the tank without dissociating any of the liquid containing parts, so that the instrument may be assembled, shipped, and installed by the user without the latter having to assemble the parts or fill the liquid containing parts with liquid, this being especially advantageous because of the fact that the filling of the parts must be done with great care and by experienced operators.

With these and other objects not specifically referred to in view, the invention consists in certain novel parts, arrangements and combinations which will be fully described in connection with the accompanying drawings, and the novel features pointed out in the claims annexed hereto.

In these drawings:—

Figure 2 is a vertical cross-sectional view on an enlarged scale of the tank instrument;

Figure 3 is an end view of the construction shown in Fig. 2, looking from the outside of the tank in the direction of arrow 3 of that figure;

Figure 4 is a sectional view taken on the irregular line 4—4 of Fig. 2;

Figure 5 is a sectional view taken on the line 5—5 of Fig. 2;

Figure 6 is a sectional view taken on the line 6—6 of Fig. 2;

Figure 7 is a detail view, partly broken away, taken on the line 7—7 of Fig. 5, and Figure 8 is a side view of part of the construction shown in Fig. 2, showing the parts in the different positions.

Figure 1:
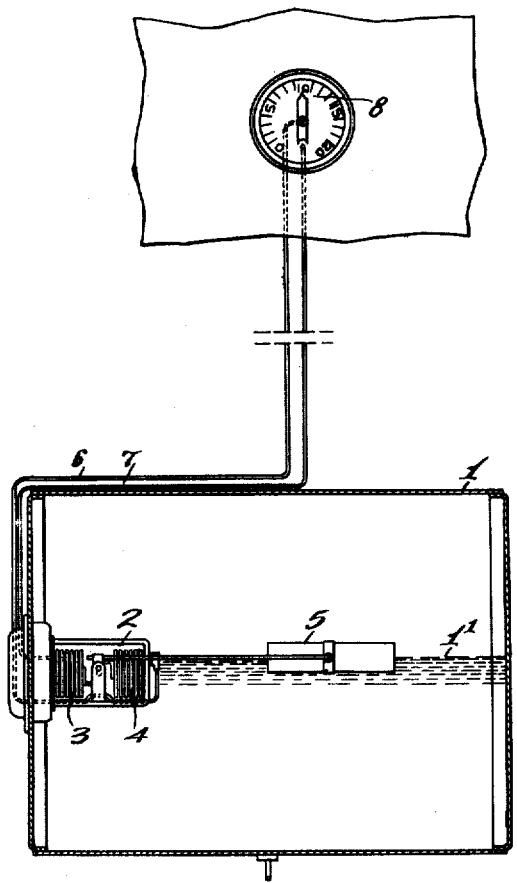
Figure 1 is a diagrammatic view, partly sectional and partly broken away, of the improved tank indicator, a tank therefor, and a needle indicating device.

Referring now to these drawings, the invention has been illustrated in connection with an indicating device in which the indicator is in the form of a dial and a needle. It will be understood, however, that this form of indicator is in no wise essential to the present invention, but that any suitable reading indicator may be employed.

Referring to Fig. 1, there is shown a tank 1 used for any desired purpose, as the fuel tank of an automobile. In this tank is located a tank instrument, indicated generally by the numeral 2. This tank instrument includes a pair of compressible and expansible chambers 3, 4 which are compressed or expanded by means of a float 5 which floats on the liquid indicated at 1' in the tank 1. These chambers 3, 4 are liquid containing chambers, generally bellows shaped and of suitable material, as light metal. These chambers are connected by pipes 6, 7 to opposite sides of the indicator, which is designated by the numeral 8, and which may be mounted in any desired position in relation to the tank. These pipes 6, 7 are filled with liquid so that the pipes and the chambers form in effect a closed circuit leading to the opposite sides of the indicator and actuating the needle to give a reading through any suitable connections not herein shown and described as unnecessary for an understanding of the invention.

In instruments constructed in accordance with the best practice, the parts will be so proportioned and arranged that the instrument and the float with the liquid containing pipes may be assembled so it can be inserted and removed as a unit. While various constructions may be provided for effecting this, in the particular construction shown in detail in Figs. 2 to 8 inclusive there is provided an open frame having a top bar 9, a bottom bar 10, these two bars being preferably integral with an end bar 11 and a circular head 12. The compressible and expansible chambers are shown as filled with suitable liquid 13, and these chambers are supported on this frame in any suitable manner. In the particular construction shown the chamber 3 is provided at one end with a boss 14 into which screws a bolt 15 having a threaded nut 16, the bolt passing through the head 12, and the chamber being clamped securely against the inside of the head by turning up on the nut 16. The chamber 4 is likewise provided with a boss 17 into which threads a clamping bolt 18 by turning up which the chamber 4 is held snugly and firmly in the face of the end 11 of the frame before referred to. The pipes 6, 7 are connected with the chambers in any suitable manner. In the particular construction shown, referring first to chamber 4, there is provided a short pipe 19 which opens into a coupling 20 provided with a fluid passage 21. One end of the pipe 6 is screw threaded into this coupling, and the pipe is bent around the frame and passes through, as shown in Fig. 2, the head 12 into a second coupling 22 provided with a liquid passage 23.

The pipe 7 is connected through a coupling 24 having a liquid passage 25, and a short pipe 26 passes through the head 12 and is connected with the other compressible chamber 3. The packing 27 is provided, if necessary or desired, between couplings 20, 22, 24 and the frame so as to make a liquid tight joint. The parts, as before stated, are assembled so that they can be removed as a unit. In the construction shown, the tank has a hole at in the side or end thereof, as indicated at 28, this hole being of sufficient dimension to permit the passage of the frame and the float. The parts are securely held in position after the instrument and the float have been passed into the tank by means of a collar 29 having a flange 30 which is in the tank and an outer flange 31 of a diameter greater than the opening 28, before referred to. The collar 29 is interiorly threaded as indicated at 32. The head 12, before referred to, is provided with a flange 33 which bears against the outer surface of the flange 30 of the collar before referred to, and this collar is clamped against the flange by means of a threaded locking ring 34 which engages the threads 32, before referred to.

The locking collar 34 is preferably formed of sufficient depth to provide a recess 35 to receive the coupling blocks 22, 24, before referred to, and the pipes 6, 7, where they pass outside the head 12, are also preferably bent to extend into this space. This construction affords substantially a flush surface. If desired, a cap plate 36 may be provided, which keeps out dirt, etc. and adds a finish to the structure, this cap plate being provided with an aperture 37 through which the two pipes 6, 7 pass to whatever point the indicating instrument may be located at. It will be seen with this construction that the parts may be assembled, the liquid holding connections filled and the parts shipped as a unit, it being necessary for the user only to insert the float and the frame in the tank and screw up the locking ring 34 and add the cap 36, if he so desires. The cap 36 may, of course, be secured in any suitable way, as by a screw 38 threaded into the outer end of the nut 16, before referred to.

In accordance with another feature of the invention, an improved construction is provided for compensating for temperature changes in the chambers and in the liquid line from the chambers to the indicator, and in the best constructions these means will be such as to permit a compensating movement of the chambers independent of the movement given the chambers by the operation of the float. These means, furthermore, will be of such construction that there is a positive connection between the two chambers, so that as one chamber is collapsed or expanded the other chamber is collapsed or expanded to the same extent, so that there is no liability of false reading at the indicator due to an uneven movement of the chambers. While the specific construction of these means may be somewhat varied, the construction as illustrated has been found effective in actual practice and is preferred. As shown, there is provided a yoke frame comprising side arms 40, 41, this yoke frame being secured to the bottom frame 10, before referred to, either integrally therewith or, as shown, by bolts 42. Pivoted in the arms of the yoke is a pair of L shaped blocks 43, 44, these blocks carrying trunnions 45 by which they are pivoted in the yoke arms. Connected to the short leg of these blocks are the float arms 46, 47.

Supported on the inner end of the two chambers 3, 4, which are spaced apart as shown in Fig. 2, is a pair of L shaped brackets 48, 49, these brackets being disposed in the particular construction shown so as to extend one above the other. These brackets are secured to the chambers in any suitable manner, as by clamping bolts 50 threaded into bosses 51, 52 formed in the chamber heads. The adjacent ends of the horizontal legs of these brackets are recessed, as indicated at 50', and the side walls of these recesses form supports for pins 53, 54 on which is pivotally mounted a link bar 55, this bar having a pivotal movement on the pins. In the legs of the blocks 43, 44 is secured a rod 56, this rod passing through a hole 56' in the link bar 55, before referred to, and having a rotary movement in this bar.

It will be observed that the axis of rod 56 is offset with respect to the axes of trunnions 45 of the blocks 43, 44, this construction being such that the rocking of the blocks 43, 44 by the float arm will cause a back and forth movement of the rod 56 and consequently a back-and-forth movement of the chambers 3, 4, so that as the float rises and falls one of the chambers is expanded and the other collapsed and vice versa, whereby a true reading of the contents of the tank is shown at the indicator.

In the best constructions means are provided for adjusting the throw of this shaft or rod 56, and in the particular construction illustrated this is effected by forming the rod in a U shape. As shown, the rod is provided at each end with short legs 57 which are provided with threads 58 to which are threaded adjusting screws 59, these screws in turn being rotatable in recesses in the blocks 43, 44, before referred to. By adjusting these screws, the position of the axis of rod 56 with respect to the pivot pins 45 is varied, so that the throw imparted to it by the movement of the float may be varied within practical limits.

Now it will be observed that if there be any compressive or expansive movement in the chambers or in the line, due to the effect of temperature changes on the liquid in the chambers or in the line, the link bar 55 may rock on its pivot pins 53, 54 independently of the movement of rod 56, thereby causing an equal movement in the two chambers, that is, as one chamber is expanded the other is expanded to the same extent, so that there is the same movement in each column of liquid, and no movement of the indicator mechanism takes place.

While the invention has been shown and described in its preferred forms, it will be understood that certain changes and variations may be made in the specific construction, arrangement and mounting of the parts without departing from the invention as defined in the claims hereunto appended.

What I claim is:

1. The combination of a tank, a float rising and falling with the liquid in the tank, a pair of liquid holding compressible and expansible chambers, a pivoted float arm, means controlled by said arm for compressing one chamber and expanding the other as the float rises and vice versa as it falls, an indicator, and means to connect said indicator with the chambers to operate it under the control of the movement of the liquid in the chambers, said controlled means including devices located between the chambers and movably connected thereto which permit expanding and contracting movements of both chambers as the temperature changes, without effecting a movement of the indicator.

2. The combination of a tank, a float rising and falling with the liquid in the tank, a pair of liquid holding compressible and expansible chambers, a pivoted float arm, means controlled by said arm for compressing one chamber and expanding the other as the float rises and vice versa as it falls, an indicator, and means to connect said indicator with the chambers to operate it under the control of the movement of the liquid in the chambers, said controlled means including devices located between the chambers and positively connected to both of them adapted for movement independent of the float whereby expanding and contracting movements of both chambers may take place as the temperature changes, without effecting a movement of the indicator.

3. The combination of a tank, a float rising and falling with the liquid in the tank, a pair of liquid holding compressible and expansible chambers, a rod connected to the chambers and to the float arm whereby the movement of the float compresses one chamber and expands the other and vice versa as the float rises and falls, an indicator, means to connect said indicator to said chambers whereby said indicator is operated by the movement of the liquid in the chambers, and means including said rod located between the chambers and connected to both chambers whereby movement of the chambers independent of the float may take place, thereby permitting expanding and contracting movements of both chambers as the temperature changes, without causing a movement of the indicator.

4. The combination of a tank, a float therein having float arms, a pair of compressible and expansible liquid holding chambers, a framework, a mounting on said framework for the float arms, means to connect said mounting with the chambers whereby the movement of the float compresses one chamber and expands the other and vice versa, said connecting means including a device located between the chambers and connected thereto and having a rocking movement independent of the float arms for effecting a simultaneous compressing or expanding movement of both chambers due to temperature changes, an indicator, and means to connect said indicator to the chambers to operate it under the control of the movement of the liquid in the chambers.

5. The combination of a tank, a float therein having float arms, a pair of compressible and expansible liquid holding chambers, a framework, a pair of blocks on said framework in which the float arms are mounted, a shaft, means to connect said shaft with the chambers, said connecting means including a link pivoted on the shaft, and connected at its opposite ends to the chambers and adapted to have a movement independent of the movement of the shaft, an indicator, and means to connect said indicator to the chambers to operate it under the control of the movement of the liquid in the chambers.

6. The combination of a tank, a float therein having float arms, a frame, a pair of liquid holding compressible and expansible chambers arranged in line end to end in the frame, a pair of blocks pivoted in the frame to which the float arms are secured, said blocks being arranged between the chambers, a shaft mounted in the blocks, means for adjusting the position of the shaft with respect to the arms, connections between the shaft and the chambers, an indicator, and means to connect said indicator to the chambers to operate it under the control of the movement of the liquid in the chambers.

7. The combination of a tank, a float in the tank having float arms, a frame, a pair of compressible and expansible chambers supported in the frame end to end in line, blocks pivoted in the frame in which the arms are secured, a shaft mounted in the blocks, means for adjusting the position of the shaft with respect to the arms, a link pivoted on the shaft, means to connect said link at opposite ends with the chambers, an indicator, and means to connect said indicator to the chambers to operate it under the control of the movement of the liquid in the chambers.

8. An instrument for indicating the liquid contents of a tank or the like, comprising a unit structure including an indicator, a framework, a pair of compressible and expansible chambers filled with liquid mounted on the frame, liquid holding pipes on the frame, means to connect said pipes with the chambers, couplings on the frame, liquid holding pipes connected to the couplings and leading to the indicator, and a float having float arms pivotally secured to a part of the frame and operatively connected to said chambers.

9. The combination of a tank, a float therein having float arms, a pair of compressible and expansible chambers, a link, means to pivotally connect said link to the chambers at its opposite ends so that as one chamber is compressed the other is likewise compressed, a pivotally mounted shaft, means to connect said shaft between the float arms and the link whereby the movement of the float compresses one chamber and expands the other and vice versa, an indicator, and pipe connections from the chambers to the indicator.

10. The combination of a tank, a float therein having float arms, a frame, a pair of compressible and expansible chambers arranged end to end with a space between, arms on the frame, blocks trunnioned in the arms and supporting the float arms, a shaft, means to connect the shaft to the chambers, a link, said means including devices to pivotally connect said link with the chambers so as to be movable independently of the shaft, an indicator, and pipe connections from the chambers to the indicator.

11. The combination of a tank, a float therein having float arms, a pair of compressible and expansible chambers, a framework having side arms, a pair of blocks, means to pivotally support said blocks on said side arms in which the float arms are mounted, a shaft supported in the blocks, means for adjusting the position of the shaft relatively to the arms, brackets on the chambers, a link mounted on said shaft and pivoted at each end to one of the brackets and having a rocking movement independent of the shaft, an indicator, and pipe connections from the chambers to the indicator.

12. In combination, an indicator, a pair of expansible and contractable liquid containing chambers, a link directly interconnecting said chambers, a float operatively connected to said chambers for expanding one and compressing the other upon movement of said float, whereby said indicator is actuated through the instrumentality of said link, said link being so interconnected to said chambers as to prevent actuation of said indicator by said link when said chambers change volume due to temperature variation.

13. In combination, a float, an indicator, and means controlled by said float for actuating said indicator, said means comprising a pair of liquid containing chambers and connections for causing one of said chambers to be expanded and the other to be contracted by movement of said float, and including a link connected to said chambers to be idly oscillated thereby upon expansion of both of said chambers or contraction of both of said chambers and to be operatively bodily shifted upon expansion of one of said chambers and contraction of the other.

14. In combination, a pair of liquid containing chambers, a float, an indicator, float-controlled means for causing one of said chambers to expand (or contract) and the other of said chambers to contract (or expand) to actuate said indicator, said means including devices for preventing thermal expansion or contraction of the liquid in said chambers from actuating the indicator, said devices including a floating link connected to each of said chambers to be actuated by each of said chambers in opposite directions.

In testimony whereof, I have hereunto set my hand.

CLARENCE A. DE GIERS.

upon expansion of one of said chambers and contraction of the other.

14. In combination, a pair of liquid containing chambers, a float, an indicator, float-controlled means for causing one of said chambers to expand (or contract) and the other of said chambers to contract (or expand) to actuate said indicator, said means including devices for preventing thermal expansion or contraction of the liquid in said chambers from actuating the indicator, said devices including a floating link connected to each of said chambers to be actuated by each of said chambers in opposite directions.

In testimony whereof, I have hereunto set my hand.

CLARENCE A. DE GIERS.

DISCLAIMER 1,791,489.—*Clarence A. De Giers*, New York, N. Y. LIQUID-LEVEL INDICATOR. Patent dated February 10, 1931. Disclaimer filed June 6, 1932, by the patentee, assignee, *The Liquidometer Corporation*, assenting.

Hereby enters this disclaimer to that part of the claim in said specification which reads as follows, to wit:

"13. In combination, a float, an indicator, and means controlled by said float for actuating said indicator, said means comprising a pair of liquid containing chambers and connections for causing one of said chambers to be expanded and the other to be contracted by movement of said float, and including a link connected to said chambers to be idly oscillated thereby upon expansion of both of said chambers or contraction of both of said chambers and to be operatively bodily shifted upon expansion of one of said chambers and contraction of the other.

"14. In combination, a pair of liquid containing chambers, a float, an indicator, float-controlled means for causing one of said chambers to expand (or contract) and the other of said chambers to contract (or expand) to actuate said indicator, said means including devices for preventing thermal expansion or contraction of the liquid in said chambers from actuating the indicator, said devices including a floating link connected to each of said chambers to be actuated by each of said chambers in opposite directions."

[*Official Gazette July 5, 1932.*]

DISCLAIMER 1,791,489.—*Clarence A. De Giers*, New York, N. Y. LIQUID-LEVEL INDICATOR. Patent dated February 10, 1931. Disclaimer filed June 6, 1932, by the patentee, assignee, *The Liquidometer Corporation*, assenting.

Hereby enters this disclaimer to that part of the claim in said specification which reads as follows, to wit:

"13. In combination, a float, an indicator, and means controlled by said float for actuating said indicator, said means comprising a pair of liquid containing chambers and connections for causing one of said chambers to be expanded and the other to be contracted by movement of said float, and including a link connected to said chambers to be idly oscillated thereby upon expansion of both of said chambers or contraction of both of said chambers and to be operatively bodily shifted upon expansion of one of said chambers and contraction of the other.

"14. In combination, a pair of liquid containing chambers, a float, an indicator, float-controlled means for causing one of said chambers to expand (or contract) and the other of said chambers to contract (or expand) to actuate said indicator, said means including devices for preventing thermal expansion or contraction of the liquid in said chambers from actuating the indicator, said devices including a floating link connected to each of said chambers to be actuated by each of said chambers in opposite directions."

[*Official Gazette July 5, 1932.*]